(12) United States Patent
Sweet et al.

(10) Patent No.: US 8,317,220 B2
(45) Date of Patent: Nov. 27, 2012

(54) CURABLE COATING COMPOSITIONS

(75) Inventors: Randall Paul Sweet, Midland, MI (US); William R. Blackwood, Midland, MI (US); Tsugio Nozoe, Chiba (JP)

(73) Assignees: Dow Corning Corporation, Midland, MI (US); Dow Corning Toray Co., Ltd., Chiyoda-ku, Tokyo (JP)

( * ) Notice: Subject to any disclaimer, the term of this patent is extended or adjusted under 35 U.S.C. 154(b) by 0 days.

(21) Appl. No.: 13/242,640

(22) Filed: Sep. 23, 2011

(65) Prior Publication Data

US 2012/0071052 A1 Mar. 22, 2012

Related U.S. Application Data

(63) Continuation of application No. 11/791,098, filed as application No. PCT/US2005/040200 on Nov. 7, 2005, now Pat. No. 8,058,190.

(60) Provisional application No. 60/649,051, filed on Feb. 1, 2005.

(51) Int. Cl.
*B32B 27/04* (2006.01)
*B60R 21/16* (2006.01)

(52) U.S. Cl. ............. 280/728.1; 442/150; 442/156; 442/157; 442/149; 427/412; 427/387; 524/507

(58) Field of Classification Search .......... 442/149, 442/150, 156, 157; 280/728.1; 427/412; 427/387; 524/507
See application file for complete search history.

(56) References Cited

U.S. PATENT DOCUMENTS

| | | | |
|---|---|---|---|
| 5,045,360 A | 9/1991 | Kosal et al. | |
| 5,208,097 A | 5/1993 | Honma et al. | |
| 5,658,674 A | 8/1997 | Lorenzetti et al. | |
| 5,700,870 A | 12/1997 | Mueller et al. | |
| 5,705,445 A | 1/1998 | Chikaraishi et al. | |
| 5,916,687 A | 6/1999 | Takanashi et al. | |
| 5,973,044 A | 10/1999 | Lutz et al. | |
| 6,037,279 A | 3/2000 | Brookman et al. | |
| 6,200,915 B1 | 3/2001 | Adams et al. | |
| 6,369,184 B1 | 4/2002 | Bohin et al. | |
| 6,387,520 B1 | 5/2002 | Fujiki et al. | |
| 6,425,600 B1 | 7/2002 | Fujiki et al. | |
| 6,511,754 B1 | 1/2003 | Bohin et al. | |
| 6,562,737 B1 | 5/2003 | Bohin et al. | |
| 6,709,752 B1 | 3/2004 | James et al. | |
| 8,058,190 B2 | 11/2011 | Sweet et al. | |
| 2004/0058601 A1 | 3/2004 | Parker | |
| 2005/0053793 A1 | 3/2005 | Benay-Oun et al. | |

FOREIGN PATENT DOCUMENTS

| | | |
|---|---|---|
| EP | 0663468 | 7/1995 |
| EP | 0553840 | 3/1996 |
| EP | 0646672 | 11/1996 |
| EP | 0764702 | 3/1997 |
| EP | 0552983 | 5/1998 |
| EP | 0669419 | 1/2000 |
| EP | 0718432 | 10/2002 |
| EP | 1078823 | 11/2002 |
| EP | 1108764 | 5/2003 |
| JP | 05140459 | 8/1993 |
| JP | 2000063637 | 2/2000 |
| JP | 2004043815 A | 2/2004 |
| JP | 2006-207105 A | 8/2006 |
| WO | 03035781 A1 | 5/2003 |
| WO | 2004005404 A1 | 1/2004 |
| WO | 2004029344 | 4/2004 |

OTHER PUBLICATIONS

English Language Translation of Japanese Application No. JP-2006-207105 from the Japanese Patent Office, 45 pages.
English Language Translation of Japanese Application No. JP-2000-063637 from Japanese Patent Office, 22 pages.
English Language Translation of Japanese Application No. JP-05-140459 from the Japanese Patent Office, 40 pages.

*Primary Examiner* — Lynda Salvatore
(74) *Attorney, Agent, or Firm* — Howard & Howard Attorneys PLLC

(57) ABSTRACT

A curable coating composition that exhibits improved cure and adhesion to various substrates, especially synthetic textiles used in the manufacture of air bags, comprises a composition curable by a hydrosilylation reaction, an acryloxy functional alkoxysilane or a methacryloxy functional alkoxysilane, an alkenyl functional silanol terminated organopolysiloxane, and an epoxy functional alkoxysilane. The curable coating composition is especially useful for application to synthetic textiles such as automotive air bags.

32 Claims, No Drawings

US 8,317,220 B2

CURABLE COATING COMPOSITIONS

CROSS REFERENCE TO RELATED APPLICATIONS

This application is a continuation application of U.S. patent application Ser. No. 11/791,098 filed 17 May 2007, now issued as U.S. Pat. No. 8,058,190, which is a U.S. national stage filing under 35 U.S.C. §371 of PCT Application No. PCT/US2005/040200 filed on 7 Nov. 2005, which claims the benefit of U.S. Provisional Patent Application No. 60/649,051 filed 1 Feb. 2005 under 35 U.S.C. §119 (e). PCT Application No. PCT/US2005/040200 and U.S. Provisional Patent Application No. 60/649,051 are hereby incorporated by reference.

BACKGROUND OF THE INVENTION

This invention is directed to curable coating compositions that adhere well to a variety of substrates, especially automotive air bags. It is particularly suitable for application to synthetic textiles, such as fiber base cloths consisting of fabrics made from polyamide fibers such as Nylon 6, Nylon 46, and Nylon 66; aramid fibers such as copolymers of p-phenylene terephthalamide and aromatic ethers; polyester fibers such as polyalkylene terephthalate; aromatic polyester fibers; vinylon fibers; rayon fibers; polyolefin fibers such as super high molecular weight polyethylene; polyoxymethylene fibers; sulfone fibers such as p-phenylene sulfones and polysulfones; polyetherimide fibers; and carbon fibers. Fabrics made of polyamide fibers and the fabrics made of polyester fibers are preferred.

Self-adhering coating compositions are generally known that cure by a hydrosilylation reaction. They contain additives that aid adhesion to a variety of substrates, thereby obviating the need for application of a primer composition prior to coating. It is an important criterion in the industrial manufacture of certain coated substrates, for example, synthetic textiles, that the coating process and the subsequent adhesive bonding between the substrate and the cured coating be achieved as rapidly as possible, to meet ever increasing demands on manufacturing output. There is therefore a continuing need to provide curable coating compositions that may be coated easily onto a suitable substrate, that are able to cure rapidly, and that achieve adhesion to the substrate quicker than heretofore possible, and without adversely affecting the physical properties of the cured material.

According to this invention, it has been found that curable coating compositions can be provided and easily coated onto suitable substrates and cured, with the concomitant rapid onset of adhesion, by using certain compounds as adhesion promoting additives.

BRIEF SUMMARY OF THE INVENTION

The invention is therefore directed to a curable coating composition comprising a composition curable by a hydrosilylation reaction; an acryloxy functional alkoxysilane or a methacryloxy functional alkoxysilane; an alkenyl functional silanol terminated organopolysiloxane; and an epoxy functional alkoxysilane.

Curable coating compositions according to the invention possess numerous advantages. Such coating compositions for example are able to cure and at the same time rapidly develop an adhesive bond to a variety of substrates, in particular to certain synthetic textiles, for example polyesters and polyamides such as Nylon 66. Thereafter, the cured coating composition exhibits good resistance to heat aging and humidity aging, and the adhesive bond to the substrate is virtually unchanged after humidity aging of 95 percent relative humidity (RH) at 70° C. These and other features of the invention will become apparent from a consideration of the detailed description.

BRIEF DESCRIPTION OF THE DRAWING

None

DETAILED DESCRIPTION OF THE INVENTION

Component (A) of the curable coating composition according to the invention is a composition curable by a hydrosilylation reaction. Operative compositions are those well known in the art. The composition curable by a hydrosilylation reaction (A) includes three components (i)-(iii). Component (i) of the composition curable by a hydrosilylation reaction (A) is an organopolysiloxane having at least two silicon bonded alkenyl groups per molecule. Component (ii) of the composition curable by a hydrosilylation reaction (A) is an organohydrogensiloxane having at least three silicon bonded hydrogen atoms per molecule. Component (iii) of the composition curable by a hydrosilylation reaction (A) is a noble metal catalyst.

Component (A)(i) can be any organopolysiloxane having at least two silicon bonded alkenyl groups per molecule, and generally consists of polymers varying from viscous materials to freely flowing liquids. It is preferred that at least some, preferably most, of the organopolysiloxane having silicon bonded alkenyl groups have a viscosity of not greater than 100 Pa·s at 25° C., more preferably 1-60 Pa·s at 25° C. These organopolysiloxanes may be homopolymers, copolymers, or mixtures of homopolymers and copolymers. The organopolysiloxanes contain units of the formula $R_a R'_b SiO_{[4-(a+b)]/2}$, wherein R is a monovalent hydrocarbon group, R' is a monovalent unsaturated hydrocarbon group, a is 0, 1, 2 or 3, and b is 0 or 1; provided that a+b is not greater than 3.

Component (A)(ii) are organohydrogensiloxanes having at least three silicon bonded hydrogen atoms, that function as the curing agent for the hydrosilylation reaction. These organohydrogensiloxanes may also vary from viscous materials to freely flowing liquids. Preferred materials have a viscosity of not greater than 500 mPa·s at 25° C., more preferably 5-55 mPa·s at 25° C. The organohydrogensiloxanes may be homopolymers, copolymers, or mixtures of homopolymers and copolymers. The organohydrogensiloxanes contain units of the formula $R_a H_b SiO_{[4-(a+b)]/2}$, wherein R, a, and b are as defined above.

Component (A)(iii) of the composition curable by a hydrosilylation reaction is a noble metal catalyst for the reaction of the alkenyl substituted organopolysiloxane (A)(i) with the organohydrogensiloxane (A)(ii). The noble metal catalyst may be a rhodium or platinum containing material. Platinum catalysts are preferred, and may take any of the known forms, ranging from platinum deposited onto carriers such as powdered charcoal, to platonic chloride, salts of platinum, chloroplatinic acids, and encapsulated forms thereof. A preferred form of platinum catalyst is chloroplatinic acid, either in the form of the commonly obtainable hexahydrate, or in the anhydrous form. Platinum complexes may also be used such as those prepared from chloroplatinic acid hexahydrate, and divinyltetramethyldisiloxane.

The curable coating composition according to the invention includes a hydrosilylation reaction inhibitor (B). Inhibitors for hydrosilylation reactions, especially those catalyzed by platinum based catalysts, are known and include, for example, acetylenic alcohols, dialkyl maleates, primary alcohols, or mixtures thereof. The hydrosilylation reaction inhibitor may be exemplified by acetylenic alcohols such as 3-methyl-1-butyn-3-ol, 3,5-dimethyl-1-hexyn-3-ol, 1-ethynyl-1-cyclohexanol, and phenylbutynol; ene-yne compounds such as 3-methyl-3-penten-1-yne, and 3,5-dimethyl-3-hexen-1-yne; tetramethyltetrahexenylcyclotetrasiloxane; and benzotriazole. The hydrosilylation reaction inhibitor is preferably present in the curable coating composition in a proportion sufficient to ensure that the coating composition cures. If no hydrosilylation reaction inhibitor is present, then the adhesion of the coating composition to a substrate may be negatively influenced, and if the concentration of the inhibitor is too high, the composition may fail to cure quickly enough.

The silicone resin component (C) may be any silicone compound having a resinous structure, but it preferably is an MQ resin consisting essentially of monovalent siloxane units M, and tetravalent siloxane units Q, and preferably a resin consisting essentially of M units $R'R_2SiO_{1/2}$ and $R_3SiO_{1/2}$, and Q units $SiO_{4/2}$, in which R and R' are as defined above; provided at least one R' group is present per molecule. It's preferred that R is an alkyl group or an aryl group having 1-18 carbon atoms, more preferably an alkyl group having 1-8 carbon atoms, such as methyl, ethyl, isopropyl, hexyl, and octyl. Preferably, R' is an alkenyl group having terminal unsaturation, meaning that the unsaturation is between the two carbon atoms that are furthest removed from the silicon atom. The alkenyl group can have 2-8 carbon atoms, preferably the vinyl group, provided there is no more than 10 percent by weight of vinyl groups per molecule, preferably 1-5 percent by weight of vinyl groups per molecule. In some cases, it may be desirable to treat the silicone resin (C) with treating agents such as hexamethyldisilazane and methyltrimethoxysilane. The silicone resin (C) may be in solid or liquid form, although it is preferred that the ratio of the units M to the units Q be such that the resin is a solid at ambient temperature and pressure, i.e., an M/Q ratio of 0.6/1 to 1.8/1, preferably 1.2/1 to 1.6/1. The silicone resin can be in the form of a 60 percent solution of the resin in a solvent such as xylene or toluene.

The adhesion promoting additive (D) of the coating composition of the invention includes four components (i)-(v). Adhesion promoting additive (D)(i) is an acryloxy functional alkoxysilane or a methacryloxy functional alkoxysilane. Some representative examples of suitable alkoxysilanes are for example 3-acryloxypropyldimethylmethoxysilane, 3-acryloxypropylmethyldimethoxysilane, 3-acryloxypropyltrimethoxysilane, 3-methacryloxymethyldimethylethoxysilane, 3-methacryloxymethyltriethoxysilane, 3-methacryloxymethyltrimethoxysilane, 3-methacryloxypropyldimethylethoxysilane, 3-methacryloxypropyldimethylmethoxysilane, 3-methacryloxypropylmethyldiethoxysilane, 3-methacryloxypropylmethyldimethoxysilane, 3-methacryloxypropyltriethoxysilane, 3-methacryloxypropyltrimethoxysilane, 3-methacryloxypropyltrisisopropoxysilane, and 3-methacryloxypropyltrismethoxyethoxysilane. Component (D)(i) is preferably used at concentrations of from 0.1-2 percent by weight of the total weight of the coating composition, preferably 0.3-1 percent by weight. Higher amounts may be desirable in instances where the coating composition is to be applied to certain textile substrates such as polyesters.

Component (ii) of adhesion promoting additive (D) is an organotitanium compound. This compound serves to catalyze the reaction of the components of the adhesion promoting additive (D). Component (ii) may be any organotitanium compound having organic groups attached to titanium through a titanium-oxygen-carbon linkage, especially orthoesters that are alcoholates or acylates in which the organic group is derived from a carboxylic acid. The organotitanium compound may also contain both alcoholate and acylate groups attached to the same titanium atom. Some representative organotitanium compounds include compounds of the formula $Ti(OR")_4$, wherein R" is an alkyl group, an alkoxyalkyl group, or an acyl group, such as tetraisopropoxytitanate, tetramethoxyethoxytitanate, and diisopropyldiacetoxytitanate. Useful organotitanium compounds include chelated or partially chelated titanium compounds. These compounds can be prepared by reacting an alcoholate as referred to above, with a diketone or a derivative thereof. Especially useful are the partially chelated titanium compounds having two alcoholate groups attached to titanium.

The presence of a catalytic amount of the organotitanium compound in the adhesion promoting additive (D) promotes the rapid onset of adhesion of the curable coating composition to the substrate, and in addition, it promotes the rapid onset of adhesion that does not deteriorate over time. The organotitanium compounds should be a compound that does not produce toxic vapors as by-products or that generates unpleasant odors that can accompany certain organotitanium compounds.

The alkenyl functional silanol terminated organopolysiloxane component (iii) of the adhesion promoting additive (D) contains units corresponding to the formula $R^2_cR'SiO_{(3-c)/2}$ and $R^2_dSiO_{(4-d)/2}$, wherein $R^2$ is an alkyl group having 1-8 carbon atoms, or an aryl group having 6-8 carbon atoms; R' is a monovalent unsaturated alkenyl or alkynl group; c is 1 or 2, and d is 1, 2 or 3. Preferably, component (iii) corresponds to the formula $H—(OSiR^2_2)_m(OSiR^2R')_n—OH$ wherein $R^2$ and R' are as defined above; R' has 2-8 carbon atoms; m is 1-6, preferably 2-5, and n is 1-6, preferably 1-3. The preferred component (iii) should have from 10-15 percent by weight of silicon bonded alkenyl groups, preferable vinyl groups, per molecule. Most useful are those polymers having a relatively low alkenyl content such that they do not significantly compete with the hydrosilylation reaction of component (A) of the coating composition. Component (iii) may be included in the adhesion promoting additive (D) in proportions of from 30 to 75 parts by weight per 100 parts of component (D)(i).

The metal chelate compounds (iv) of the adhesion promoting additive (D) function to enhance the adhesion promoting characteristics of the adhesion promoting additive (D). Any metal chelate that is compatible with the coating composition, and that does not interfere with the hydrosilylation reaction of the constituents of component (A), is suitable. Some examples of metal chelates include acetyl acetonates such as triacetyl acetonates of aluminium, tetraacetyl acetonates of zirconium, and triacetylacetonates of iron. Aluminium chelates are preferred wherein the aluminium is chelated with 1,3-diketones such as acetylacetonate, or hydroxycarboxylic acids such as tartaric acid. The most preferred aluminium chelate is aluminium acetylacetonate. Aluminium chelates enhance and increase the rate of adhesion of the coating composition and the substrate. The metal chelate may be present in the coating composition in proportions of 1-50 parts by weight per 100 parts by weight of component (D)(i), preferably 1-3 parts by weight per 100 parts of component (D)(i), or 0.004 to 0.3 percent by weight of the coating composition. Higher levels of metal chelates may impair the flame resistance of the curable coating composition.

Component (v) of the adhesion promoting additive (D) is an epoxy functional alkoxysilane. Some representative examples of suitable epoxy functional alkoxysilanes are for example 2-(3,4-epoxycyclohexyl)ethyltriethoxysilane, 2-(3,4-epoxycyclohexyl)ethyltrimethoxysilane, 5,6-epoxyhexyltriethoxysilane, 3-glycidoxypropyldimethylethoxysilane, 3-glycidoxypropylmethyldiethoxysilane, 3-glycidoxypropylmethyldimethoxysilane, 3-glycidoxypropyltriethoxysilane, and 3-glycidoxypropyltrimethoxysilane.

The adhesion promoting additive (D) may be present in the curable coating composition in an amount that is 0.1-3.2 percent by weight of the total weight of the curable coating composition.

Component (E) of the curable coating composition is an inorganic filler that may be selected from those fillers known in the silicone rubber art for reinforcement, viscosity adjustment, improving heat resistance, and improving flame retardancy. The inorganic filler (E) may be exemplified by reinforcing fillers such as fumed titanium oxide; microparticulate silicas including fumed silica, precipitated silica, and calcined silica; nonreinforcing fillers such as quartz powder, diatomaceous earth, iron oxide, aluminum oxide, calcium carbonate, and magnesium carbonate; and by any of these fillers that have been treated with an organosilicon compound such as an organosilane, an organosiliazane, or an organopolysiloxane.

Among these fillers, ultramicroparticulate silicas with a particle diameter of 50 millimicron and more, and a specific surface area of 50 or less $m^2/g$, are especially useful. Surface treated silica is even more preferred. A surface treated silica is a silica whose surface has been preliminarily treated with an organosilane, an organosilazane such as hexamethyldisilazane, or a diorganocyclopolysiloxane. If desired, the surface of the filler can also be treated with a vinyl functional organosilane, a vinyl functional organosilazane, or with component (iii) of the adhesion promoting additive (D). The quantity of addition of Component (E) will vary with the type of inorganic filler, but generally will be within the range of 5-10 percent by weight of the curable coating composition. Other adjuvants may also be added to the curable coating composition such as metal carbonates; pigments; catalyst inhibitors; heat stabilizers; and bath life extenders.

Component (F) of the curable coating composition is a cyclic alkenyl group bearing polysiloxane. Some examples of Component (F) include 1,3,5-trivinyl-1,3,5-trimethylcyclotrisiloxane, 1,3,5,7-tetravinyl-1,3,5,7-tetramethylcyclotetrasiloxane, pentavinylpentamethylcyclopentasiloxane, and 1,3,5,7-tetra-allyl-1,3,5,7-tetramethylcyclotetrasiloxane.

Curable coating compositions according to the invention may be formed by simply mixing components (A)-(F). The curable coating composition may be provided in one part, although it is preferred for storage stability reasons, to provide the curable coating composition in two or more parts, preferably in two parts. The two part composition may then be mixed in the required proportions prior to its use. It is important to distribute the components over the two or more parts of the curable coating composition in the correct fashion to obtain storage stability. Accordingly, the curable coating compositions can be formulated in a number of ways, provided that the organohydrogensiloxane and the noble metal catalyst of component (A) are stored separately. Components (D)(i) and (D)(iii) are also preferably stored separately. Prereacted combinations of components (i) and (iii) can be used. A preferred method of storing a two part composition consists of storing as the first part of the composition, the alkenyl organopolysiloxane (A)(i), the resin (C), the noble metal catalyst, the components (D)(ii), (iii), and (iv); and in a second part, the organohydrogensiloxane of component (A), the acryloxy functional alkoxysilane or the methacryloxy functional alkoxysilane (D)(i), and the inhibitor (B). The two parts should preferably be such as to enable one to combine the reactants in a way that permits mixing the two parts in a 10:1 to 5:1 weight ratio, preferably in a 1:1 weight ratio.

When mixed, the curable coating compositions herein should have a viscosity that is appropriate to the particular application, machinery used for applying the coating, and the substrate or synthetic textile to be coated, but generally it is in the range 2-120 Pa·s at 25° C. Preferred materials have a viscosity in the range 8-30 Pa·s at 25° C., and are able to cure within one-half minute at a temperature of 150-180° C. to provide elastomeric materials. Curable coating compositions according to the invention should typically be capable of remaining at workable viscosities for at least 3-6 hours when stored at temperatures less than about 40° C.

The curable coating compositions according to the invention are useful as coatings for a number of substrates such as fibrous materials including papers and textiles, glass, and metals. The curable coating compositions are particularly suitable as coatings for synthetic textiles such as polyester and Nylon woven fabrics typically used in the manufacture of automotive air bags. They may also be used as protective coatings; as coatings to reduce permeability of the substrate such as textiles to gases including air, or for any other purpose for which curable coating compositions have been used. Generally, the curable coating compositions are capable of imparting tear strength, abrasion resistance, hydrophobicity, or impact resistance, to a variety of substrates. The curable coating compositions of the invention may be coated onto a substrate by any coating techniques including gravure, knife blade coating, and screen printing techniques.

Cured products can be obtained by applying the curable coating composition to synthetic textiles for example by applying it to the synthetic textile, and allowing the coated composition to cure. Curing may be carried out by any suitable method including the application of heat or radiation. Heating is the preferred method, and preferably at temperatures of 100-200° C., more preferably at 140-180° C. One major advantage is that good adhesion can be achieved after relatively short curing times that range from 30 seconds to an hour, generally 1-30 minutes, and typically 1-15 minutes at 150° C. An increase in curing temperature allows a shortening of the curing time.

EXAMPLES

The following examples are set forth in order to illustrate the invention in more detail. In the Examples and Tables, the percent of the various components of the curable coating composition denotes the percent by weight of the components based on the total weight of the curable coating composition.

Comparison Example 1

A fully formulated curable coating composition was prepared by combining Components A-F in the amounts shown in Table 1. The composition was applied to a synthetic textile, and allowed to cure by the application of heat. The coated synthetic textile was then tested for adhesion of the composition to the synthetic textile by a Crease Flex Test that determines the number of Crease Flex Cycles. The Crease Flex Test protocol and the Test results are shown following the Examples.

TABLE 1

Curable Coating Composition

| Component | Percent | Description |
|---|---|---|
| (A)(i) | 57.33 | Organopolysiloxane with two silicon bonded alkenyl groups |
| (A)(ii) | 8.77 | Organohydrogensiloxane with three silicon bonded hydrogens |
| (A)(iii) | 0.29 | Platinum Complex |
| (B) | 0.03 | 1-Ethynyl-1-cyclohexanol |
| (C) | 25.97 | Silicone MQ Resin |
| (D)(i) | 0 | Methacryloxypropyltrimethoxysilane |
| (D)(ii) | 0.59 | Tetraisopropoxytitanate |
| (D)(iii) | 0 | Alkenyl functional silanol terminated organopolysiloxane |
| (D)(iv) | 0.29 | Aluminum Acetylacetonate |
| (D)(v) | 0.31 | 3-Glycidoxypropyltrimethoxysilane |
| (E) | 6.18 | Hexamethyldisilazane treated fumed silica |
| (F) | 0.24 | 1,3,5,7-tetravinyl-1,3,5,7-tetramethylcyclotetrasiloxane |

Examples 2-6

Comparison Example 1 was repeated, and five (5) fully formulated curable coating compositions were prepared, by combining Components A-F in the amounts shown in Tables 2-6. The compositions were applied to a synthetic textile, allowed to cure, and tested for adhesion.

TABLE 2

Curable Coating Composition

| Component | Percent | Description |
|---|---|---|
| (A)(i) | 57.18 | Organopolysiloxane with two silicon bonded alkenyl groups |
| (A)(ii) | 8.00 | Organohydrogensiloxane with three silicon bonded hydrogens |
| (A)(iii) | 0.29 | Platinum Complex |
| (B) | 0.03 | 1-Ethynyl-1-cyclohexanol |
| (C) | 25.97 | Silicone MQ Resin |
| (D)(i) | 0.48 | Methacryloxypropyltrimethoxysilane |
| (D)(ii) | 0.59 | Tetraisopropoxytitanate |
| (D)(iii) | 0.18 | Alkenyl functional silanol terminated organopolysiloxane |
| (D)(iv) | 0.15 | Aluminum Acetylacetonate |
| (D)(v) | 0.71 | 3-Glycidoxypropyltrimethoxysilane |
| (E) | 6.18 | Hexamethyldisilazane treated fumed silica |
| (F) | 0.24 | 1,3,5,7-tetravinyl-1,3,5,7-tetramethylcyclotetrasiloxane |

TABLE 3

Curable Coating Composition

| Component | Percent | Description |
|---|---|---|
| (A)(i) | 57.33 | Organopolysiloxane with two silicon bonded alkenyl groups |
| (A)(ii) | 8.33 | Organohydrogensiloxane with three silicon bonded hydrogens |
| (A)(iii) | 0.29 | Platinum Complex |
| (B) | 0.03 | 1-Ethynyl-1-cyclohexanol |
| (C) | 25.97 | Silicone MQ Resin |
| (D)(i) | 0.48 | Methacryloxypropyltrimethoxysilane |
| (D)(ii) | 0.19 | Tetraisopropoxytitanate |
| (D)(iii) | 0.36 | Alkenyl functional silanol terminated organopolysiloxane |
| (D)(iv) | 0.29 | Aluminum Acetylacetonate |
| (D)(v) | 0.31 | 3-Glycidoxypropyltrimethoxysilane |
| (E) | 6.18 | Hexamethyldisilazane treated fumed silica |
| (F) | 0.24 | 1,3,5,7-tetravinyl-1,3,5,7-tetramethylcyclotetrasiloxane |

TABLE 4

Curable Coating Composition

| Component | Percent | Description |
|---|---|---|
| (A)(i) | 57.18 | Organopolysiloxane with two silicon bonded alkenyl groups |
| (A)(ii) | 7.72 | Organohydrogensiloxane with three silicon bonded hydrogens |
| (A)(iii) | 0.29 | Platinum Complex |
| (B) | 0.03 | 1-Ethynyl-1-cyclohexanol |
| (C) | 25.97 | Silicone MQ Resin |
| (D)(i) | 0.96 | Methacryloxypropyltrimethoxysilane |
| (D)(ii) | 0.39 | Tetraisopropoxytitanate |
| (D)(iii) | 0.18 | Alkenyl functional silanol terminated organopolysiloxane |
| (D)(iv) | 0.15 | Aluminum Acetylacetonate |
| (D)(v) | 0.71 | 3-Glycidoxypropyltrimethoxysilane |
| (E) | 6.18 | Hexamethyldisilazane treated fumed silica |
| (F) | 0.24 | 1,3,5,7-tetravinyl-1,3,5,7-tetramethylcyclotetrasiloxane |

TABLE 5

Curable Coating Composition

| Component | Percent | Description |
|---|---|---|
| (A)(i) | 57.40 | Organopolysiloxane with two silicon bonded alkenyl groups |
| (A)(ii) | 8.20 | Organohydrogensiloxane with three silicon bonded hydrogens |
| (A)(iii) | 0.44 | Platinum Complex |
| (B) | 0.005 | 1-Ethynyl-1-cyclohexanol |
| (C) | 26.89 | Silicone MQ Resin |
| (D)(i) | 0.48 | Methacryloxypropyltrimethoxysilane |
| (D)(ii) | 0.39 | Tetraisopropoxytitanate |
| (D)(iii) | 0.18 | Alkenyl functional silanol terminated organopolysiloxane |
| (D)(iv) | 0.15 | Aluminum Acetylacetonate |
| (D)(v) | 0.71 | 3-Glycidoxypropyltrimethoxysilane |
| (E) | 4.91 | Hexamethyldisilazane treated fumed silica |
| (F) | 0.24 | 1,3,5,7-tetravinyl-1,3,5,7-tetramethylcyclotetrasiloxane |

TABLE 6

Curable Coating Composition

| Component | Percent | Description |
|---|---|---|
| (A)(i) | 59.81 | Organopolysiloxane with two silicon bonded alkenyl groups |
| (A)(ii) | 8.20 | Organohydrogensiloxane with three silicon bonded hydrogens |
| (A)(iii) | 0.44 | Platinum Complex |
| (B) | 0.005 | 1-Ethynyl-1-cyclohexanol |
| (C) | 21.85 | Silicone MQ Resin |
| (D)(i) | 0.48 | Methacryloxypropyltrimethoxysilane |
| (D)(ii) | 0.39 | Tetraisopropoxytitanate |
| (D)(iii) | 0.18 | Alkenyl functional silanol terminated organopolysiloxane |
| (D)(iv) | 0.15 | Aluminum Acetylacetonate |
| (D)(v) | 0.71 | 3-Glycidoxypropyltrimethoxysilane |
| (E) | 7.44 | Hexamethyldisilazane treated fumed silica |
| (F) | 0.34 | 1,3,5,7-tetravinyl-1,3,5,7-tetramethylcyclotetrasiloxane |

Crease Flex Test Protocol & Results

The test protocol for measuring the Crease Flex in Cycles to Failure of the coated synthetic textiles prepared above, was carried out using a Scott No. 363 Type Folding and Abrasion Tester sold by Test Machines, Incorporated, Ronkonkoma, N.Y., and manufactured by Toyo Seiki Seisaku-Sho, Ltd., Tokyo, Japan. This test is widely used in the industry for measuring the fold abrasion and the resistance against fold fatigue, of synthetic textiles, rubber, and cloth. According to the standard test protocol, two coated fabric test strips of measuring 25 millimeter×120 millimeter are placed together, with the coated sides facing each other. The reciprocating distance of folding is set for 5 centimeter. The test strips are placed in test clamps, and the applied pressure is adjusted to 1 Kilogram. The test measures the number of cycles of folding. The number of cycles are counted to the failure point of lost adhesion of coating composition applied to the Nylon fabric.

The results of the Crease Flex Test are shown in Table 7. The weight of the coating on the 46×46 plain weave 420 denier Nylon fabric was about 30 g/m$^2$.

TABLE 7

Crease Flex Test-Cycles to Failure

| Example | Cycles to Failure |
|---|---|
| 1-Comparison | 500 |
| 2 | 2,167 |
| 3 | 6,500 |
| 4 | 5,500 |
| 5 | 10,667 |
| 6 | 9,167 |

It can be seen in Table 7 that the curable coating compositions according to the invention in Examples 2-6, that contained Components (D)(i), (D)(iii), and (D)(v), i.e., the methacryloxy functional alkoxysilane, the alkenyl functional silanol terminated organopolysiloxane, and the epoxy functional alkoxysilane, produced significantly better results, than the curable coating composition of Comparison Example 1, that contained only the epoxy functional alkoxysilane (D)(v).

Curable coating compositions according to this invention can be prepared by combining Components (A)-(F) in amounts within the ranges shown in Table 8.

TABLE 8

Ranges of Components (A)-(F) for Curable Coating Compositions

| Component | Range (%) | Description |
|---|---|---|
| (A)(i) | 45.00-70.00 | Organopolysiloxane with two silicon bonded alkenyl groups |
| (A)(ii) | 6.00-12.00 | Organohydrogensiloxane with three silicon bonded hydrogens |
| (A)(iii) | 0.01-0.60 | Platinum Complex |
| (B) | 0.005-0.075 | Hydrosilylation Reaction Inhibitor |
| (C) | 15.00-35.00 | Silicone MQ Resin |
| (D)(i) | 0.01-5.00 | Acryloxy or Methacryloxy functional alkoxysilane |
| (D)(ii) | 0.05-1.00 | Organotitanium Compound |
| (D)(iii) | 0.01-3.00 | Alkenyl functional silanol terminated organopolysiloxane |
| (D)(iv) | 0.01-0.30 | Metal Chelate |
| (D)(v) | 0.20-2.00 | Epoxy functional alkoxysilane |
| (E) | 0.50-15.00 | Inorganic Filler |
| (F) | 0.01-0.50 | Cyclic alkenyl group bearing polysiloxane |

Other variations may be made in compounds, compositions, and methods described herein without departing from the essential features of the invention. The embodiments of the invention specifically illustrated herein are exemplary only and not intended as limitations on their scope except as defined in the appended claims.

The invention claimed is:

1. A curable coating composition comprising:
    a composition curable by a hydrosilylation reaction;
    an acryloxy functional alkoxysilane or a methacryloxy functional alkoxysilane;
    an alkenyl functional silanol terminated organopolysiloxane; and
    an epoxy functional alkoxysilane.

2. A curable coating composition according to claim 1 wherein the composition curable by a hydrosilylation reaction comprises:
    an organopolysiloxane having at least two silicon bonded alkenyl groups per molecule,
    an organohydrogensiloxane having at least three silicon bonded hydrogen atoms per molecule, and
    a noble metal catalyst.

3. A curable coating composition according to claim 1 further comprising an inhibitor for the hydrosilylation reaction.

4. A curable coating composition according to claim 3 wherein the inhibitor is selected from the group consisting of acetylenic alcohols, dialkyl maleates, primary alcohols, or mixtures thereof.

5. A curable coating composition according to claim 1 further comprising a silicone resin.

6. A curable coating composition according to claim 5 wherein the silicone resin comprises an MQ resin.

7. A curable coating composition according to claim 1 further comprising a filler.

8. A curable coating composition according to claim 7 wherein the filler comprises microparticulate silica.

9. A curable coating composition according to claim 1 further comprising a cyclic alkenyl group bearing polysiloxane.

10. A curable coating composition according to claim 9 wherein the cyclic alkenyl group bearing polysiloxane is selected from the group consisting of
    1,3,5-trivinyl-1,3,5-trimethylcyclotrisiloxane,
    1,3,5,7-tetravinyl-1,3,5,7-tetramethylcyclotetrasiloxane,
    pentavinylpentamethylcyclopentasiloxane, and
    1,3,5,7-tetra-allyl-1,3,5,7-tetramethylcyclotetrasiloxane.

11. A curable coating composition according to claim 9 wherein the curable coating composition contains 0.01-0.05 percent by weight of the cyclic alkenyl group bearing polysiloxane based on the total weight of the curable coating composition.

12. A curable coating curable coating composition according to claim 1 further comprising an organotitanium compound.

13. A curable coating composition according to claim 1 further comprising a metal chelate compound.

14. A curable coating composition according to claim 13 wherein the metal chelate compound is selected from the group consisting of a triacetyl acetonate of aluminium, a tetraacetyl acetonate of zirconium, and a triacetylacetonate of iron.

15. A curable coating composition according to claim 1 in which the acryloxy functional alkoxysilane is selected from the group consisting of 3-acryloxypropyldimethylmethoxysilane, 3-acryloxypropylmethyldimethoxysilane, 3-acryloxypropyltrimethoxysilane, methacryloxymethyldimethylethoxysilane, methacryloxymethyltriethoxysilane, methacryloxymethyltrimethoxysilane, methacryloxypropyldimethylethoxysilane, methacryloxypropyldimethylmethoxysilane, methacryloxypropylmethyldiethoxysilane, methacryloxypropylmethyldimethoxysilane, methacryloxypropyltriethoxysilane, methacryloxypropyltrimethoxysilane, methacryloxypropyltrisisopropoxysilane, and methacryloxypropyltrismethoxyethoxysilane.

16. A curable coating composition according to claim 1 wherein the curable coating composition contains 0.01-2.00 percent by weight of the acryloxy functional alkoxysilane or methacryloxy functional alkoxysilane based on the total weight of the curable coating composition.

17. A curable coating composition according to claim 1 in which the alkenyl functional silanol terminated organopolysiloxane has the formula H—$(OSiR^2_2)_m(OSiR^2R')_n$—OH wherein $R^2$ is an alkyl group having 1-8 carbon atoms or an aryl group having 6-8 carbon atoms; R' is a monovalent unsaturated hydrocarbon group having 2-8 carbon atoms; and m and n are each 1-6.

18. A curable coating composition according to claim 1 wherein the curable coating composition contains 0.01-3.00 percent by weight of the alkenyl functional silanol terminated organopolysiloxane based on the total weight of the curable coating composition.

19. A curable coating composition according to claim 1 in which the epoxy functional alkoxysilane is selected from the group consisting of 2-(3,4-epoxycyclohexyl)ethyltriethoxysilane, 2-(3,4-epoxycyclohexyl)ethyltrimethoxysilane, 5,6-epoxyhexyltriethoxysilane, 3-glycidoxypropyldimethylethoxysilane, 3-glycidoxypropylmethyldiethoxysilane, 3-glycidoxypropylmethyldimethoxysilane, 3-glycidoxypropyltriethoxysilane, and 3-glycidoxypropyltrimethoxysilane.

20. A curable coating composition according to claim 1 wherein the curable coating composition contains 0.20-2.00 percent by weight of the epoxy functional alkoxysilane based on the total weight of the curable coating composition.

21. A textile coated with a cured coating composition according to claim 1.

22. A textile according to claim 21 further defined as an automotive air bag.

23. A method of coating a textile with the curable coating composition according to claim 1, said method comprising the step of applying the curable coating composition to the textile.

24. A method according to claim 23 further comprising the step of applying heat to the curable coating composition after application to the textile for promoting cure of the curable coating composition.

25. A method according to claim 24 wherein heat is applied at a temperature of from 100-200° C.

26. A method according to claim 25 wherein heat is applied for a period of time of from 30 seconds to an hour.

27. A method according to claim 23 further comprising the step applying radiation to the curable coating composition after application to the textile for promoting cure of the curable coating composition.

28. A method according to claim 23 wherein the textile is further defined as an automotive air bag.

29. A two-part curable coating composition comprising:
   I) a first-part of the composition comprising;
      an organopolysiloxane having at least two silicon bonded alkenyl groups per molecule,
      a silicone resin,
      an organotitanium compound,
      an alkenyl functional silanol terminated organopolysiloxane,
      a metal chelate compound, and
      an epoxy functional alkoxysilane, and
      optionally, a noble metal catalyst; and
   II) a second-part of the composition comprising;
      an organohydrogensiloxane having at least three silicon bonded hydrogen atoms per molecule,
      an inhibitor, and
      an acryloxy functional alkoxysilane or a methacryloxy functional alkoxysilane.

30. A two-part curable coating composition according to claim 29 comprising said noble metal catalyst.

31. A two-part curable coating composition according to claim 29 further comprising a filler.

32. A two-part curable coating composition according to claim 29 further comprising a cyclic alkenyl group bearing polysiloxane.

* * * * *